United States Patent
Chessell et al.

(10) Patent No.: US 9,836,331 B2
(45) Date of Patent: Dec. 5, 2017

(54) SHARED RESOURCE UPDATING

(71) Applicant: International Business Machines Corporation, Armonk, NY (US)

(72) Inventors: Amanda E. Chessell, Alton (GB); Fenglian Xu, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 14/626,447

(22) Filed: Feb. 19, 2015

(65) Prior Publication Data
US 2015/0242247 A1 Aug. 27, 2015

(30) Foreign Application Priority Data
Feb. 21, 2014 (GB) .................... 1403088.6

(51) Int. Cl.
*G06F 17/00* (2006.01)
*G06F 9/52* (2006.01)
*H04L 29/06* (2006.01)
*G06F 17/30* (2006.01)

(52) U.S. Cl.
CPC ........ *G06F 9/526* (2013.01); *G06F 17/30353* (2013.01); *H04L 67/42* (2013.01); *G06F 17/30362* (2013.01)

(58) Field of Classification Search
CPC ............... G06F 17/30353; G06F 17/30362
See application file for complete search history.

(56) References Cited

U.S. PATENT DOCUMENTS

| | | | |
|---|---|---|---|
| 5,615,373 A | 3/1997 | Ho | |
| 6,842,754 B2 * | 1/2005 | Muntz | G06F 17/30067 |
| 7,849,098 B1 * | 12/2010 | Scales | G06F 17/30067 |
| | | | 707/781 |
| 7,899,799 B2 | 3/2011 | Furuya | |
| 8,078,483 B1 * | 12/2011 | Hirose | G06Q 10/02 |
| | | | 705/1.1 |
| 8,112,528 B2 | 2/2012 | Capomassi et al. | |
| 2009/0063488 A1 | 3/2009 | Daum et al. | |
| 2010/0161573 A1 | 6/2010 | Chan et al. | |
| 2010/0211682 A1 * | 8/2010 | Capomassi | G06F 17/30353 |
| | | | 709/226 |

OTHER PUBLICATIONS

Search Report for British Patent Application No. GB1403088.6, dated Jul. 23, 2014, 3 pages.

* cited by examiner

*Primary Examiner* — Zachary K Huson
(74) *Attorney, Agent, or Firm* — Robert C. Bunker; Edell, Shapiro & Finnan, LLC (57) ABSTRACT

Method and system are provided for updating data at a shared resource in a concurrent user environment. The method includes: a first client application carrying out the steps of: pulling data from a shared resource for update wherein the data includes a timestamp of a last update; requesting a lock on the data only allowing updates from the first client for a set period of time; working on the data whether or not a lock is in place for the first client application. Wherein when a first client application applies to update the data, a check is carried out to compare the timestamp of the data updated by the first client application with the current timestamp of the data, and if these do not match, the update fails.

20 Claims, 6 Drawing Sheets

SHARED RESOURCE UPDATING

BACKGROUND OF INVENTION

This invention relates to the field of shared resource data updating and locking mechanisms. In particular, the invention relates to a client locking mechanism for shared resource data updating.

In Web applications, multiple independent users may start working on the same data at the same time. For example, two people may try to reserve the same airline seat at the same time. There is currently no good system to provide a fair outcome to such situations for the end users. The users may spend a lot of time trying to book a non-existing ticket or being unable to book a ticket as another user started the booking process earlier and took a long time to book it. Such systems need a way to determine which person's update/request will be successful.

There are two main existing locking patterns. Firstly, a pessimistic locking pattern, where the first person locks the data while they are updating it. The lock is released when the update is complete. This means that a second person is made to wait until the lock is released; however, when they do get their turn at the lock then they know they have exclusive access to the data.

This style of lock works where there is high contention for data and the changes to data are not very frequent. However, it has the disadvantage that if a first person takes a long time, no one else can access data. The lock is generally given a time-out to enable others to get to the data, this time-out must be set to be long enough for the biggest transaction because once the time-out happens, the first person must start again.

Figure 1:
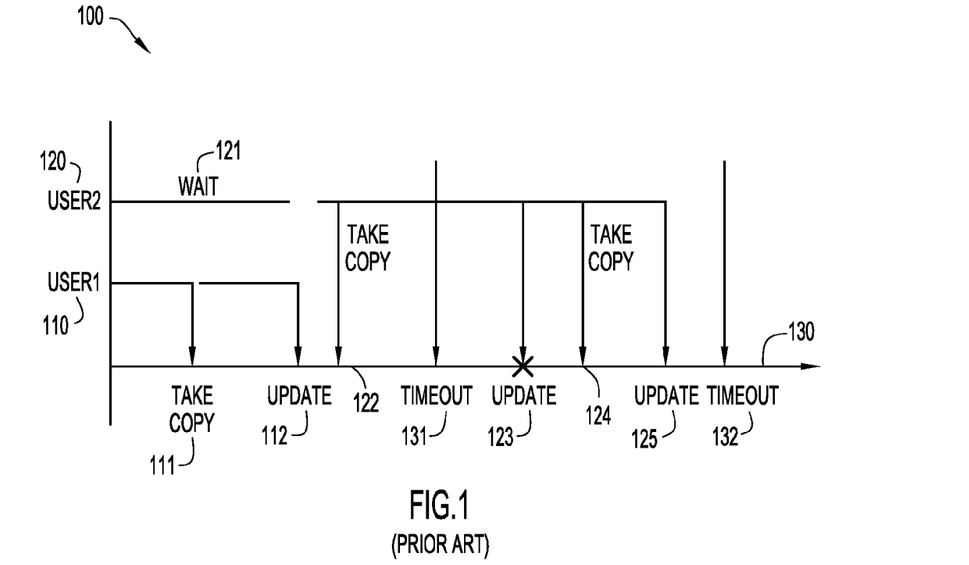
FIG. 1 is a schematic diagram of a first locking method as known in the prior art.

Referring to FIG. 1, a schematic diagram illustrates this method of the prior art referred to as pessimistic locking. A first user (User 1) activity 110 and a second user (User 2) activity 120 are shown on a time-line 130.

As shown in the pessimistic locking of FIG. 1, User 1 110 takes a copy 111 and is able to update 112 their changes successfully before the lock is timed-out 131. User 2 has to wait 121 due to a lock for User 1, and then takes a copy 122. User 2 tries to update 123 but the lock timed-out 131. So User 2 takes another copy 124 which updates 125 successfully before the next time-out 132.

User 2 could only update their changes at the second time. This has made the second user frustrated for the following reasons: User 2 has to wait for a turn to get an access to the data; User 2's first time update is failed due to a lock time-out; User 2 has to take another copy of the data before updating the data; and User 2 may be able to make an update successfully at the second time if User 2 completes in time.

A second locking pattern is an optimistic locking pattern, in which multiple users can take a copy of data at anytime, make changes and then update the data. Whoever updates the data first is successful. This works using timestamps. The timestamp is saved whenever the data is updated. When an update is required, the user takes a copy of the data and the timestamp. When the update is made, the saved timestamp is compared with the copy. If they are the same, the data is saved. If they are different, someone else has changed the data and the user must start it again. This style of locking works well when there are a few updates compared with the number of reads. If there are many updates (for example, in a time of high demand), then there is a lot of contention. A long transaction has little chance of success.

Figure 2:
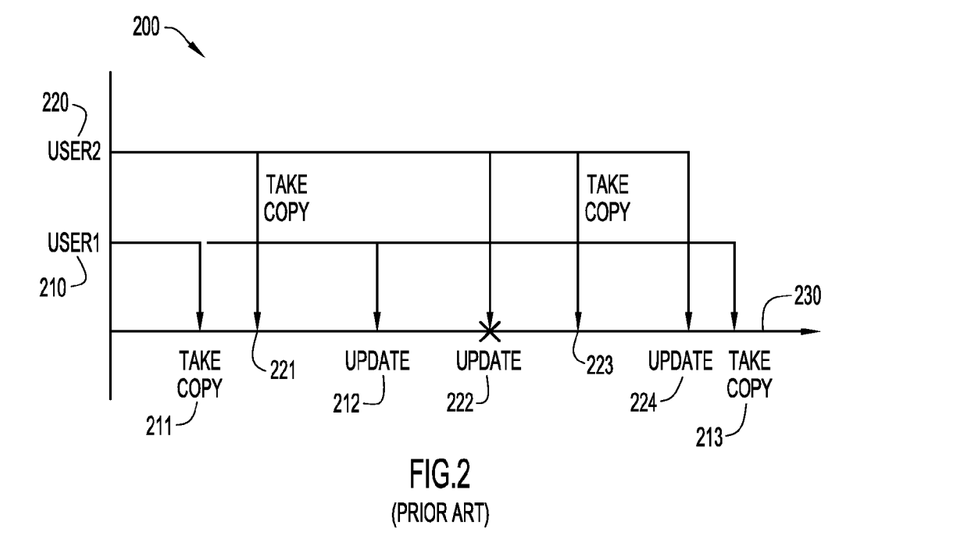
FIG. 2 is a schematic diagram of a second locking method as known in the prior art.

FIG. 2 is a schematic diagram illustrating this method of the prior art referred to as optimistic locking. A first user (User 1) activity 210 and a second user (User 2) activity 220 are shown on a time-line 230.

User 1 210 takes a copy 211, and shortly after User 2 220 also takes a copy 221. The copies have timestamps of the last update. User 1 then updates 212 the data and the timestamp is updated. User 2 then tries to update 222 the data but as the timestamps are different, this fails. User 2 must take a new copy 223 with the updated timestamp and make a further update 224 which this time is successful. User 1 210 may take a further copy 213 for additional updates.

The pessimistic locking might block other people for a long time and the optimistic may require people to rework on the data which they have worked on. Therefore, neither of these methods has provided a good solution for a concurrent environment in Web applications.

Therefore, there is a need in the art to address the aforementioned problems.

SUMMARY

According to a first aspect of the present invention there is provided a method for updating data at a shared resource in a concurrent user environment, comprising: a first client application carrying out the steps of pulling data from a shared resource for update wherein the data includes a timestamp of a last update, requesting a lock on the data only allowing updates from the first client for a set period of time; working on the data whether or not a lock is in place for the first client application; wherein when a first client application applies to update the data, a check is carried out to compare the timestamp of the data updated by the first client application with the current timestamp of the data, and if these do not match, the update fails.

The method may include one or more second client applications concurrently carrying out the steps of the first aspect of the present invention.

The method may include the first client application receiving notification from a server of an update to the data and the latest timestamp. A server may carry out regular checks of a shared resource to notify client applications of data updates and latest timestamps.

The set period of time for a lock may be approximately equal to the time it takes for a client to undertake an average transaction. The set period of time for a lock may be varied depending on the volume of updates being received from client applications for a resource. A lock may include a timeout when it expires and releases the data for access by other client applications.

A first client application may receive notification of an update to the data and the latest timestamp and may include carrying out the steps of loading the latest data and setting the timestamp to the latest timestamp; and displaying a list of changes for the first client application to apply to the latest data.

According to a second aspect of the present invention there is provided a system for updating data at a shared resource in a concurrent user environment, comprising: a first client application including; a pull mechanism for pulling data from a shared resource for update wherein the data includes a timestamp of a last update; a lock request mechanism for requesting a lock on the data only allowing updates from the first client for a set period of time; an update component for working on the data whether or not a lock is in place for the first client application; and a server for controlling updates to the shared resource and includes an update check component, and wherein when a first client application applies to update the data, the update check component carries out a check to compare the timestamp of the data updated by the first client application with the current timestamp of the data, and if these do not match, the update fails.

The system may includes one or more second client applications including the features of the first client application.

The server includes a checking component for carrying out regular checks of a shared resource to notify client applications of data updates and latest timestamps. The set period of time for a lock may be approximately equal to the time it takes for a client to undertake an average transaction. The server may include a resource locking mechanism including a timer for a timeout to release the data for access by other client applications. The resource locking component may include a dynamic component for varying the set period of time for a lock depending on the volume of updates to a resource.

An update component of a first client application when receiving notification of an update to the data and the latest timestamp may carry out the steps of loading the latest data and setting the timestamp to the latest timestamp; and displaying a list of changes for the first client application to apply to the latest data.

According to a third aspect of the present invention there is provided a computer program product for updating data at a shared resource in a concurrent user environment, the computer program product comprising a computer-readable storage medium having computer-readable program code embodied therewith, the computer-readable program code configured to: pull data from a shared resource for update wherein the data includes a timestamp of a last update; request a lock on the data only allowing updates from the first client for a set period of time; work on the data whether or not a lock is in place for the first client application; and check to compare the timestamp of the data being updated with the current timestamp of the data, and if these do not match, the update fails.

According to a fourth aspect of the present invention there is provided a computer program comprising computer program code stored on a computer readable medium to, when loaded into a computer system and executed thereon, cause the computer system to perform all the steps of a method according to the first aspect.

According to a fifth aspect of the present invention there is provided a method substantially as described with reference to the figures.

According to a sixth aspect of the present invention there is provided a system substantially as described with reference to the figures.

The described aspects of the invention provide the advantage of allowing multiple users to concurrently have a chance to update the same data without wasting too long working on either incorrect data or old data.

BRIEF DESCRIPTION OF THE DRAWINGS

The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A resource locking method and resource locking system are described for providing fair access for concurrent Web technologies for updating common data.

The described resource locking allows multiple users to concurrently have a chance to update particular data of a shared resource, and allows each user an opportunity to update the same data by providing a reservation lock time which is relatively short, but gives each user a limited time with an exclusive access to the data.

The reservation lock may be of a duration configured for a specific environment depending on how often updates are happening and how long an average update takes. Typically, this may be less than a minute in duration.

The locking combines a client side pull implementation which allows each user to pull a data and timestamp of the data from a resource database and a service server implementation which uses a resource lock mechanism to ensure that there is only one update happening during the resource lock time.

The optimistic pattern is used as shown in FIG. 2. However, a user can take a reservation lock to reserve access to the data. This reservation lock time is relatively short, but gives the user a limited time with an exclusive access to the data. If the lock times-out, the user can continue their updates and follows the optimistic pattern. So it can provide other users to have a turn. In database systems, a lock reservation mechanism may be applied to acquire and release a resource lock for a certain amount of time. This mechanism assumes that each update is a separate transaction.

A client side implements a regular pull of the latest data and the timestamp before making any changes. This will make sure each user has the most up to date data to work on to reduce the risk of spending too much time with a disappointment. The example of airline ticket booking system with only one ticket, if users know the last ticket has been sold earlier, this would save their lots of time and effort to continue on booking a no-longer existing ticket.

Figure 3:
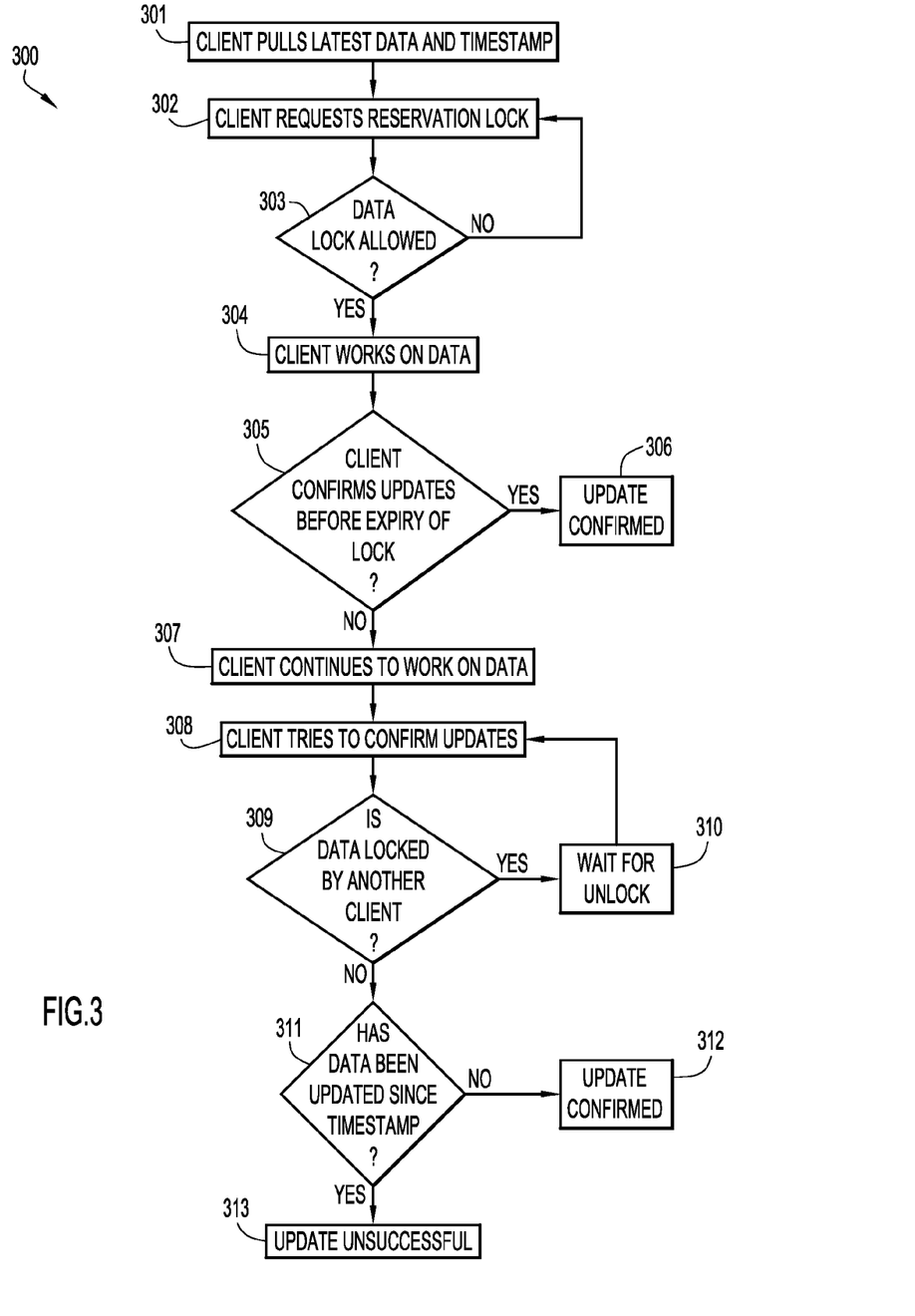
FIG. 3 is a flow diagram of an example embodiment of a first aspect of a method in accordance with the present invention.

Referring to FIG. 3, a flow diagram 300 shows an example embodiment of an aspect of the described method.

A client may pull 301 a latest version of a piece of data and a timestamp of the last update of the data from a shared resource such as a database. The client may request 302 a reservation lock on the data. If the data lock is allowed 303, the client may work 304 on the data.

If the reservation lock is not allowed 303, the client may wait and request 302 the reservation lock again after a given period. Meanwhile, the client may also work on the data; however, the client does not have a lock on the data so may be disappointed when confirming the updates if another client has updated the data in the meantime.

If the lock is allowed, the client has exclusive access for a limited period of time. It may be determined 305 if the client confirms his updates before the expiry of the lock. If so, the update is confirmed 306.

If the client does not confirm his update before the expiry of the lock, the lock is released and the client may continue 307 to work on the data. The client may then try to confirm 308 his updates. It may then be determined 309 if the data is locked by another client, if it is locked by another client, then the first client may wait 310 for the data to be unlocked by regularly attempting to confirm 308 his updates.

Once it is determined 309 that the data is no longer locked by another client, it may then be determined 311 if the data has been updated since the timestamp of the data when the client pulled the data at step 301. If the timestamp has not been updated, the update may be confirmed 312. However, if the timestamp has been updated, then the update is unsuccessful 313.

Figure 4:
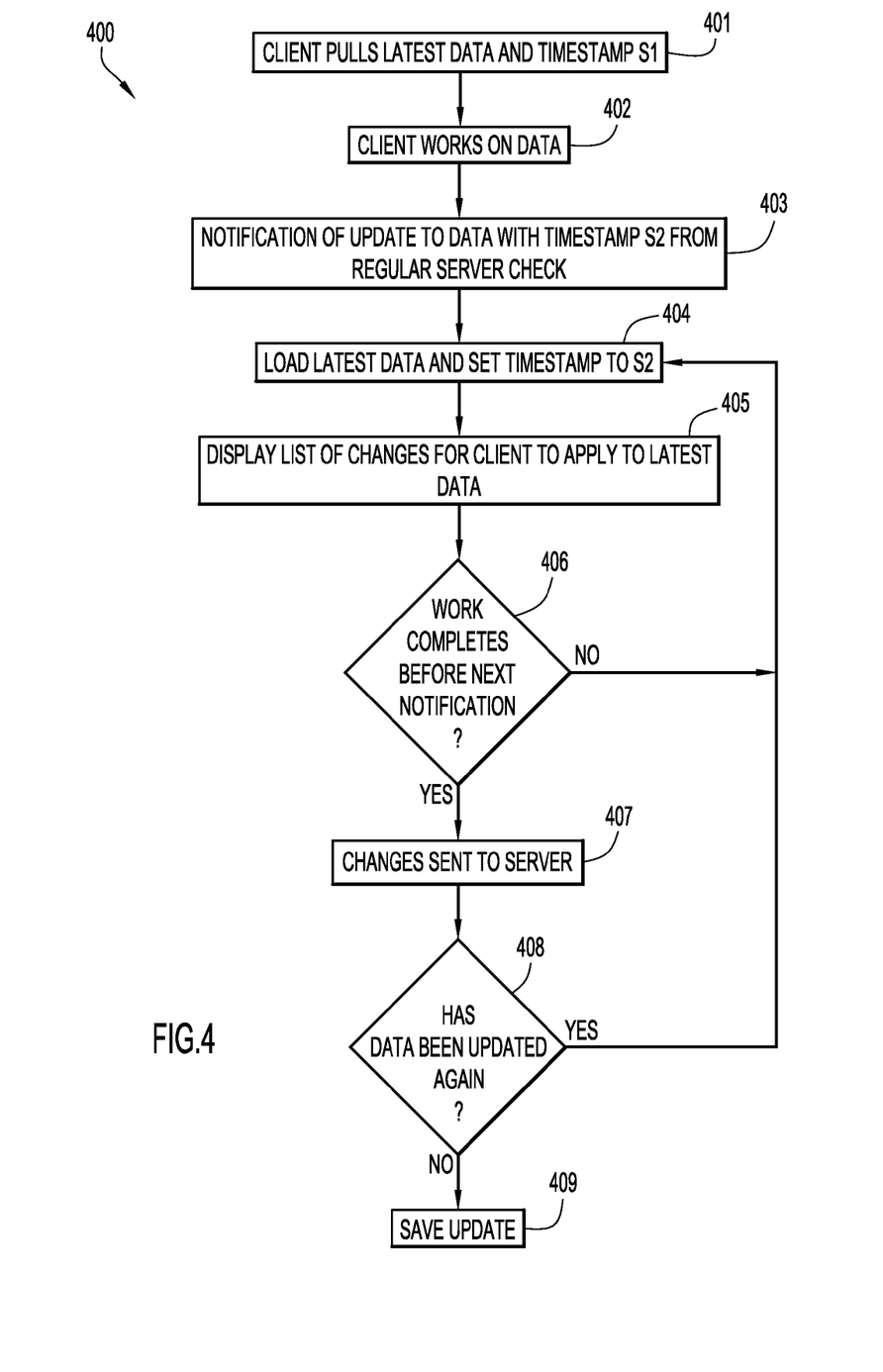
FIG. 4 is a flow diagram of an example embodiment of a second aspect of a method in accordance with the present invention.

Referring to FIG. 4, a flow diagram 400 shows an example embodiment of a further aspect of the described method.

A client may pull the latest data and timestamp S1 from a shared resource. The client may work 402 on the data without a reservation lock on the data, for example, if the client's reservation lock has timed-out.

A notification may be received 403 at the client of an update to the data with timestamp S2. This notification may be generated by a regular server check operation and notifications are sent to clients who are working on a piece of data. The client may load the latest data and set the timestamp to S2. The list of changes for the client to apply to the latest data based on the changes already made by the client may be displayed 405.

It is determined 406 if the work completes before the next notification. If it does not complete before the next notification, then the method loops to step 404 to load the latest data and timestamp. However, if it does complete before the next notification, then the changes 407 may be sent to the server.

It may be determined 408 at the server whether the data has been updated again. If so, the method loops to step 404 to load the latest data and timestamp. If the data has not been updated the update may be saved 409.

FIGS. 5A to 5D show schematic diagrams 510, 520, 530, 540 of different scenarios of two users User 1 (U1) 501 and User 2 (U2 502) attempting to update a common resource against a timeline 503.

Figure 5A:
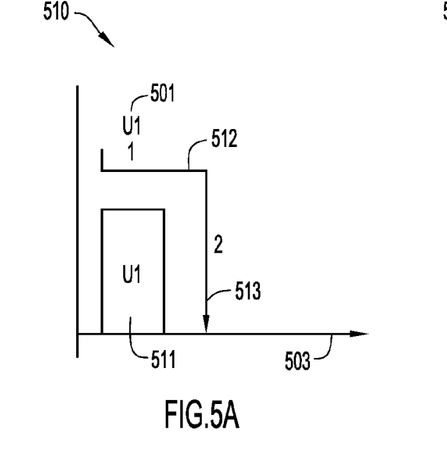
FIGS. 5A to 5D are schematic diagrams illustrating an example of a method in accordance with the present invention.

Referring to FIG. 5A, the diagram 510 shows User 1 501 having taken a reservation lock 511 on the common data. User 1 501 is attempting to update 512 the data. The reservation lock 511 of User 1 501 times-out, however since no-one else updates the data, the subsequent update 513 of User 1 501 confirms.

Figure 5B:
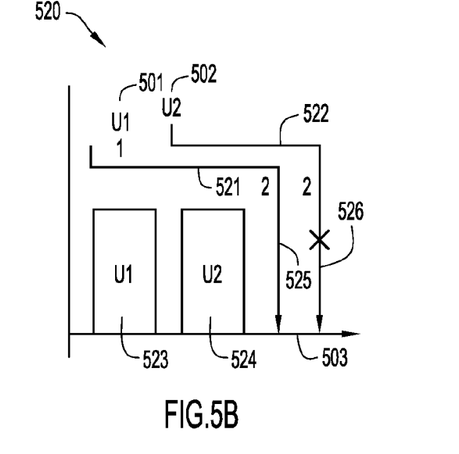

Referring to FIG. 5B, the diagram 520 shows User 1 501 and User 2 502 attempting to update 521, 522 the same data. User 1 501 has a first reservation lock 523 which times-out without User 1 being able to update the data. User 2 502 has a second reservation lock 524 which also times-out without User 2 being able to update the data. Both users have to wait for the data to be free of a lock. Then, whoever updates first after the data is free of a lock, will have a successful update. In this case, User 1 501 updates first 525 and is successful whilst User 2 502 makes a later update 526 which is unsuccessful and fails.

Figure 5C:
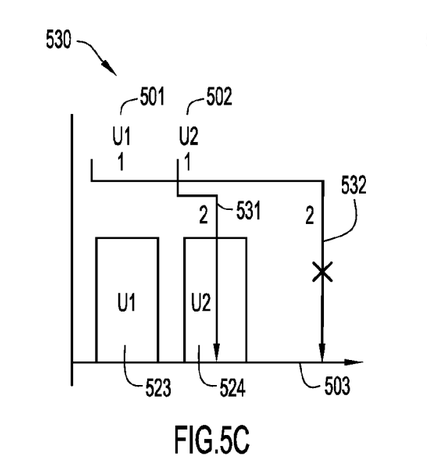

Referring to FIG. 5C, the diagram 530 shows a scenario similar to that of FIG. 5B. However, in this scenario, User 2 502 updates 531 the data during the time of holding the resource lock and is therefore successful in the update. The update 532 of User 1 501 is failed and, thus, User 1 is forced to take the latest data to work on.

Figure 5D:
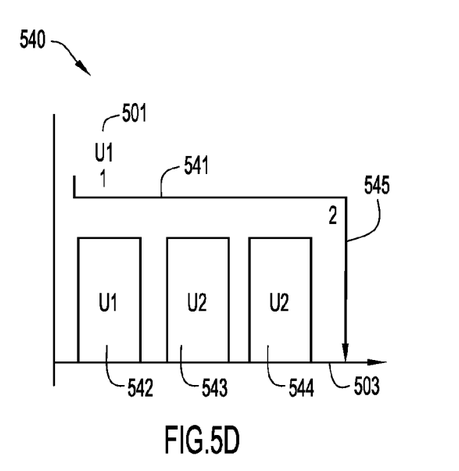

Referring to FIG. 5D, User 1 501 takes a copy 541 of data and holds the resource lock 542 but is unable to update data during holding the lock time. User 2 502 holds the resource lock twice 543, 544 but without changing data. User 1 501 still has a chance to update 545 the data without retaking a copy of the data when the lock is free.

Typical Web applications use a three-tier architecture of a client web application, a server, and a resource such as a database.

Figure 6:
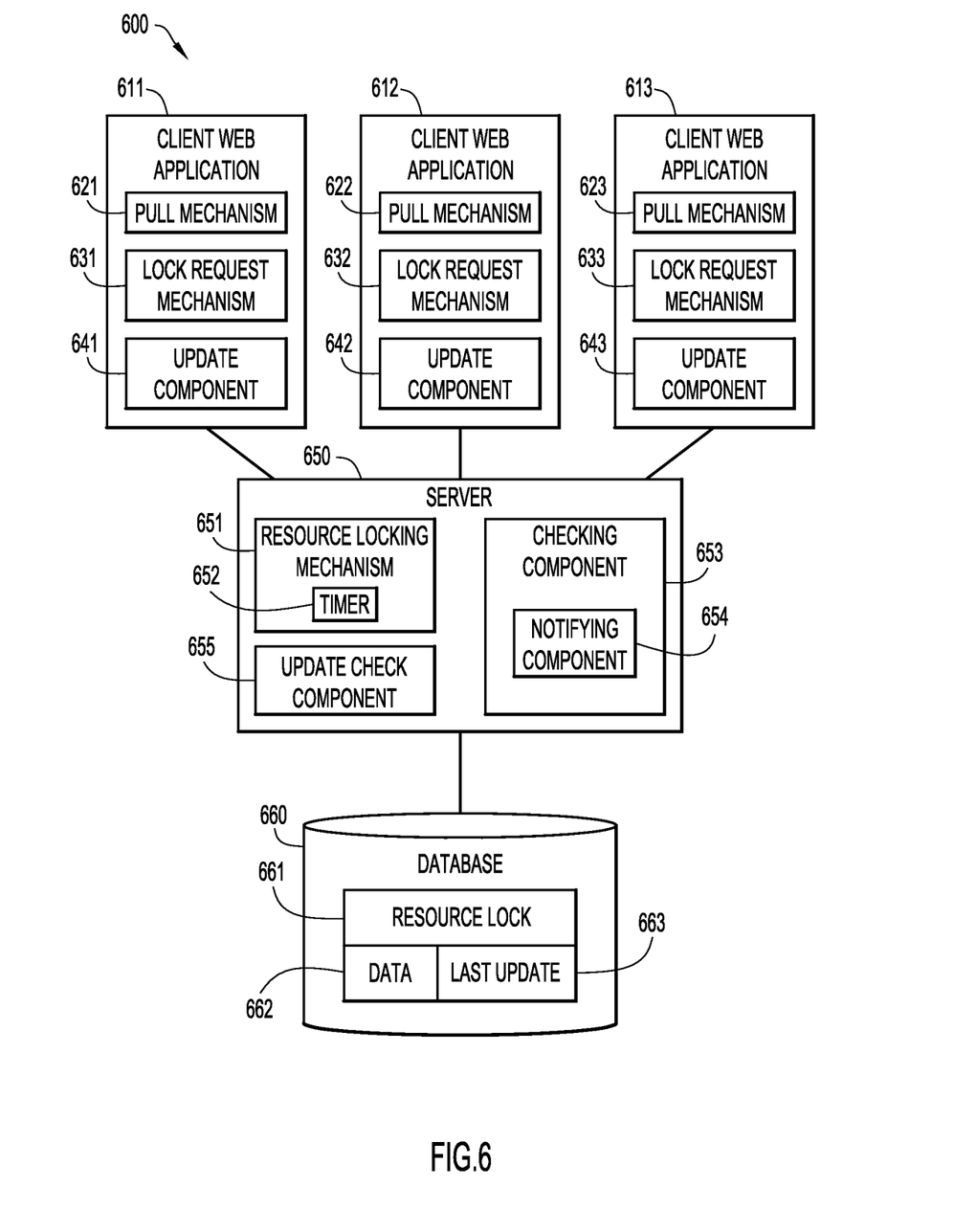
FIG. 6 is block diagram of an example embodiment of a system in accordance with the present invention.

Referring to FIG. 6, an example embodiment of the described system 600 is shown with three client web applications 611, 612, 613, a server 650 and a database 660.

Each client web application 611, 612, 613 may have a pull mechanism 621, 622, 623 which may be implemented by programming at the client side and which may pull data 662 with a timestamp of the last update 663 from the database 660. Each web application 611, 612, 613 may include a lock request mechanism 631, 632, 633 for requesting a lock on data 662 at the database 660. Each web application 611, 612, 613 may also include an update component 641, 642, 643 for updating the data 662 at the database 660.

The server 650 may include a resource locking mechanism 651 to ensure there is only one update happening during a given time to data 662 at the database 660, and other users cannot update that data concurrently. The resource locking mechanism 651 may have a timer 652 with a defined time-out. This may be implemented by the server 610 using SQL SELECT * for UPDATE with a short time out.

The server 650 may also include checking component 653 for regularly checking data 662 at the database 660 and a notifying component 654 for regularly notifying client web applications 611, 612, 613 of updates with new timestamps for last updates 663 for data 662.

The server 650 may also include an update check component 655 for checking if an update by a client web application 611, 612, 613 includes a timestamp which matches a current timestamp of the data being updated. If the timestamps do not match, the update will fail.

A resource lock 661 may be implemented in the database 660 for locking data 662 for update by a single client web application 611, 612, 613 for a defined length of time.

The described locking pattern allows one user either to update data without retaking a copy of the data or to re-take a copy of the latest data as soon as possible which avoids spending too long working on data which has been changed in the database.

The resource locking mechanism 651 of the server 650 may include a dynamic aspect in that when the system has more updates requested, in order to give users an opportunity to make a successful update, the time period of the reservation lock may be reduced. The smaller the reservation lock time, the better chance there is for a faster user to make a successful update. When the system has less updates being requested, the reservation lock time may be set to be longer so that the faster user still has an opportunity to successfully update their request with less lock switching between different users.

A client pull mechanism 621 may be implemented by the following two steps.

Step 1: Pull a data and timestamp from database. The query interval may be set according to the characteristic of the Web application.

- User 1 may load up a data to a Web browser and may start to work with this data which has a last update timestamp: S1.
- In the meantime, a data state agent is sending a request about the data and the last update timestamp every 2 minutes, for instance, to the server.
- The REST service layer may send the request to the database about the last update timestamp of this data.
- The server layer may receive the latest last update state of the data: S2, and returns S2 back to the client.
- At the client, if S2 !=S1, then a notification message may be displayed to the end user such as: "The data which you are currently working on has been modified by other users since you last updated it. Do you want to refresh the latest data to continue your work?" else if S2=S1 do nothing.

Step 2: Update the latest data without losing the changes that have already been made.

- If user selects to refresh the data, the latest data will be loaded up, and set S1=S2.
- Web client would also be required to display the list of changes for the user to apply the changes to the latest data.
- If User 1 completes the work before receiving a next notification message, the changes will be sent to the server.
- There is also a last minute check at the saving time, if data has been updated again by someone else since the last client query for state, the same notification message will be received. This would require all steps in Step 2 to be repeated again.

The locking is implemented in the client (not the database) to maximize throughput under varying loads. The described method combines the pessimistic locking as shown in FIG. 1 in the database with optimistic locking as shown in FIG. 2 in the application server to create a mechanism that switches between these mechanisms as the system load changes.

An advantage of this mechanism is that it provides the latest data to an update. It also provides an opportunity for end users to make a decision to either cancel their work or update their temporary changes based on the most recent data without losing their work. It also reduces user frustration and addresses a common problem across Master Data Management servers and Web applications.

Figure 7:
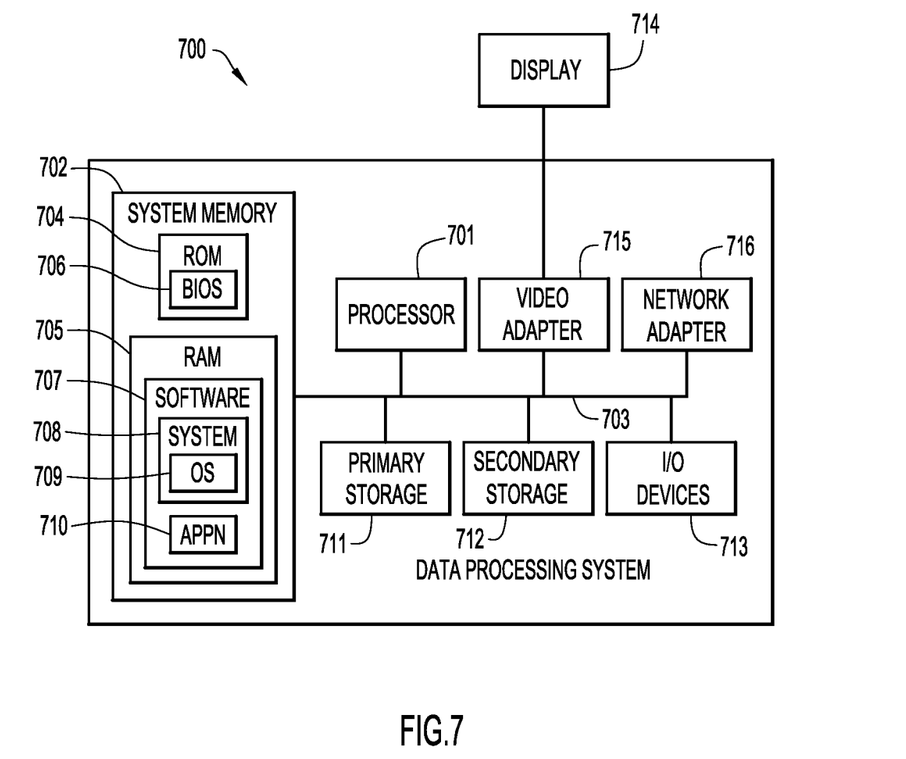
FIG. 7 is a block diagram of an embodiment of a computer system in which the present invention may be implemented.

Referring to FIG. 7, an exemplary system for implementing aspects of the invention includes a data processing system 700 suitable for storing and/or executing program code including at least one processor 701 coupled directly or indirectly to memory elements through a bus system 703. The memory elements may include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. Software 707 may be stored in RAM 705 including system software 708, including operating system software 709. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 may be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (FLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A computer-implemented method for updating data at a shared resource in a concurrent user environment, comprising:
    retrieving data from a shared resource for update, wherein the retrieved data includes a first timestamp of a last update;
    requesting a lock on the retrieved data, the lock only allowing the data to be updated from a client application for a set period of time;
    allowing at least one update to be prepared for the retrieved data via the client application while the lock is in place and subsequent to expiration of the lock; and
    comparing the first timestamp with a current timestamp when the client application attempts to apply the prepared update to the retrieved data, the update being applied to the retrieved data when the first timestamp matches the current timestamp.

2. The computer-implemented method of claim 1, further comprising:
    receiving a notification from a server of an update to the data subsequent to the first timestamp; and
    receiving a second timestamp of the update.

3. The computer-implemented method of claim 2, wherein the server reviews the shared resource to determine if a notification and a second timestamp should be transmitted to the client application.

4. The computer-implemented method of claim 1, wherein the set period of time for a lock is approximately equal to the time it takes for the client application to undertake an average transaction.

5. The computer-implemented method of claim 1, wherein the set period of time for a lock is varied depending on the volume of updates being received from client applications for a shared resource.

6. The computer-implemented method of claim 1, wherein the lock includes a timeout and the data is released for access by other client applications when the timeout expires.

7. The computer-implemented method of claim 2, further comprising the steps of:
   replacing the retrieved data with the updated data;
   replacing the first timestamp with the second time stamp; and
   displaying a list of changes for the client application to apply to the updated data.

8. A system for updating data at a shared resource in a concurrent user environment, comprising:
   a computer with a processor;
   a client application including:
      a pull mechanism configured to pull data from a shared resource for update, wherein the pulled data includes a first timestamp of a last update;
      a lock request mechanism configured to request a lock on the pulled data, the lock only allowing the data to be updated from the client application for a set period of time; and
      an update component configured to allow a user to prepare at least one update for the pulled data via the client application while the lock is in place and subsequent to expiration of the lock,
      wherein the client application is configured to compare the first timestamp with a current timestamp when the client application attempts to apply the prepared update to the pulled data, the update being applied to the pulled data when the first timestamp matches the current timestamp; and
   a server with a processor configured to control updates to the shared resource, comprising:
      an update check component configured to perform checks of the shared resource.

9. The system of claim 8, wherein the client application is a first client application and the computer system further comprises:
   a second client application including the features of the first client application.

10. The system of claim 8, wherein the update check component is configured to:
   notify the client application of updates to the pulled data including a second timestamp that is subsequent to the first timestamp.

11. The system of claim 8, wherein the set period of time for a lock is approximately equal to an amount of time it takes for the client application to undertake an average transaction.

12. The system of claim 8, wherein the server further comprises:
   a resource locking mechanism including a timer for a timeout, wherein locked data is released for access by other client applications when the timeout expires.

13. The system of claim 12, wherein the resource locking mechanism comprises:
   a dynamic component for varying the set period of time for a lock depending on the volume of updates to the shared resource.

14. The system of claim 10, wherein upon receiving notification of an update to the pulled data including a second timestamp from the update check component, the update component of the client application carries out the steps of:
   replacing the pulled data with the updated data;
   replacing the first timestamp with the second timestamp; and
   displaying a list of changes for the client application to apply to the updated data.

15. A computer program product for updating data at a shared resource in a concurrent user environment, the computer program product comprising:
   a computer-readable storage medium having computer-readable program code embodied therewith, the computer-readable program code configured to:
      pull data from a shared resource for update, wherein the pulled data includes a first timestamp of a last update;
      request a lock on the pulled data, the lock only allowing the data to be updated from a client application for a set period of time;
      allow a user to prepare at least one update for the pulled data via the client application while the lock is in place and subsequent to expiration of the lock; and
      compare the first timestamp with a current timestamp, the update being applied to the retrieved data when the first timestamp matches the current timestamp.

16. The computer program product of claim 15, wherein the computer-readable program code is further configured to:
   perform checks of the shared resource for updates to the pulled data including a second timestamp that is subsequent to the first timestamp; and
   notify the client application of any such updates.

17. The computer program product of claim 15, wherein the set period of time for a lock is approximately equal to an amount of time it takes for the client application to undertake an average transaction.

18. The computer program product of claim 15, wherein the locking includes a timeout, wherein locked data is released for access by other client applications when the timeout expires.

19. The computer program product of claim 15, wherein the set period of time for a lock is dynamically varied depending on the volume of updates to the shared resource.

20. The computer program product of claim 16, wherein upon receiving notification of an update to the pulled data including a second timestamp the computer-readable program code is further configured to:
   replace the pulled data with the updated data;
   replace the first timestamp with the second timestamp; and
   display a list of changes for the client application to apply to the updated data.

* * * * *